(12) United States Patent
Palin et al.

(10) Patent No.: US 10,839,062 B2
(45) Date of Patent: Nov. 17, 2020

(54) METHOD AND APPARATUS FOR CONFIGURING SERVICES BASED ON TOUCH SELECTION

(71) Applicant: NOKIA TECHNOLOGIES OY, Espoo (FI)

(72) Inventors: Arto Palin, Viiala (FI); Jari Antero Nikara, Lempaala (FI); Vesa-Veikko Luukkala, Espoo (FI); Petri Liuha, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 103 days.

(21) Appl. No.: 15/614,102

(22) Filed: Jun. 5, 2017

(65) Prior Publication Data

US 2017/0372054 A1 Dec. 28, 2017

Related U.S. Application Data

(63) Continuation of application No. 13/450,130, filed on Apr. 18, 2012, now abandoned.

(51) Int. Cl.
*G06F 21/34* (2013.01)
*G06F 21/62* (2013.01)
(Continued)

(52) U.S. Cl.
CPC ............. *G06F 21/34* (2013.01); *G06F 21/44* (2013.01); *G06F 21/6218* (2013.01); *H04W 4/48* (2018.02); *H04W 4/80* (2018.02)

(58) Field of Classification Search
CPC ......... H04W 4/48; H04W 12/00; G06F 21/00; G06F 21/34; G06F 21/6218
See application file for complete search history.

(56) References Cited

U.S. PATENT DOCUMENTS 4,873,530 A 10/1989 Takeuchi et al.
5,134,392 A 7/1992 Takeuchi et al.
(Continued)

FOREIGN PATENT DOCUMENTS

| EP | 1695880 A1 | 8/2006 |
|---|---|---|
| JP | 2006088756 A | 4/2006 |
| WO | 2011/053357 A1 | 5/2011 |

OTHER PUBLICATIONS

Varadarajan, "Bluetooth-Based Keyless Entry System", web-page,The Clemson University Vehicular Electronics Laboratory, Mar. 20, 2011 retrieved on Aug. 17, 2017 from http://www.cvel.clemson.edu/auto/AuE835_Projects_2011/Varadarajan_project.html, 3 pages.

*Primary Examiner* — Linglan E Edwards
(74) *Attorney, Agent, or Firm* — Ditthavong & Steiner, P.C.

(57) ABSTRACT

An approach is provided for configuring one or more mobile devices to one or more services associated with at least one structure based on various contexts, access criteria, and/or security levels. The access platform determines proximity information of one or more devices with respect to at least a first access point, a second access point, or a combination thereof associated with at least one structure. The access platform next processes and/or facilitates a processing of the proximity information to determine one or more roles, one or more accesses, one or more rights, or a combination thereof. The access platform then determines one or more services to make available based, at least in part, on the one or more roles, the one or more accesses, the one or more rights, or a combination thereof.

17 Claims, 10 Drawing Sheets

(51) Int. Cl.
*H04W 4/80* (2018.01)
*G06F 21/44* (2013.01)
*H04W 4/48* (2018.01)

(56) References Cited

U.S. PATENT DOCUMENTS

| | | | |
|---|---|---|---|
| 8,290,480 B2* | 10/2012 | Abramson | H04W 12/0802 |
| | | | 455/418 |
| 8,520,502 B2* | 8/2013 | Tenny | H04W 8/26 |
| | | | 370/216 |
| 8,717,198 B2* | 5/2014 | Choi | G01C 21/3688 |
| | | | 340/988 |
| 9,083,581 B1* | 7/2015 | Addepalli | H04W 4/046 |
| 2008/0226057 A1 | 9/2008 | Holder | |
| 2009/0170554 A1* | 7/2009 | Want | H04M 1/72502 |
| | | | 455/552.1 |
| 2009/0254980 A1* | 10/2009 | Kanaparti | H04L 63/107 |
| | | | 726/4 |
| 2010/0207722 A1 | 8/2010 | Rutledge | |
| 2011/0309922 A1 | 12/2011 | Ghabra et al. | |
| 2012/0071151 A1* | 3/2012 | Abramson | H04L 67/12 |
| | | | 455/418 |
| 2012/0142367 A1 | 6/2012 | Przybylski | |
| 2012/0163167 A1 | 6/2012 | Dade | |
| 2012/0242510 A1* | 9/2012 | Choi | G01C 21/3688 |
| | | | 340/988 |

* cited by examiner

METHOD AND APPARATUS FOR CONFIGURING SERVICES BASED ON TOUCH SELECTION

RELATED APPLICATION

This application is a continuation of U.S. patent application Ser. No. 13/450,130, filed Apr. 18, 2012, entitled "METHOD AND APPARATUS FOR CONFIGURING SERVICES BASED ON TOUCH SELECTION", which is incorporated herein by reference in its entirety.

BACKGROUND

Service providers and device manufacturers (e.g., wireless, cellular, etc.) are continually challenged to deliver value and convenience to consumers by, for example, providing compelling network services. One area of interest has been the development of interactive resources and services available to users of mobile devices (e.g., mobile phones or tablets) while driving or being a passenger in a vehicle. More specifically, the resources and services are provisioned between the mobile devices and one or more network attachment points in the vehicle (e.g., an access point (AP)) based on one or more short-range wireless communication technologies such as Bluetooth, Near Field Communication (NFC), or a combination thereof. Once a connection between a device and the vehicle has been established, the device can use the resources associated with the vehicle (e.g., loudspeakers, steering wheel buttons, hands-free or text-to-speech systems, displays, projectors, etc.) and the vehicle may benefit from the resources of the device (e.g., global positioning system (GPS) sensors, internet connectivity, messaging technologies, etc.). However, the introduction and/or use of multiple mobile devices near or within the vehicle pose a number of dynamic configuration and security concerns. More specifically, certain services require different kinds of authentication in different contexts (e.g., unlocking a vehicle door compared to media rendering). Moreover, the context of the device user may affect the possible selection, offering, and using of one or more services. Further, one or more device users may want to share services associated with the vehicle, the one or more other devices, or a combination thereof. Accordingly, service providers and device manufacturers face significant technical challenges in providing a service that expeditiously configures one or more mobile devices to one or more services associated with at least one structure based on various contexts, access criteria, and/or security levels.

SOME EXAMPLE EMBODIMENTS

Therefore, there is a need for an approach for configuring one or more mobile devices to one or more services associated with at least one structure based on various contexts, access criteria, and/or security levels.

According to one embodiment, a method comprises determining proximity information of one or more devices with respect to at least a first access point, a second access point, or a combination thereof associated with at least one structure. The method also comprises processing and/or facilitating a processing of the proximity information to determine one or more roles, one or more accesses, one or more rights, or a combination thereof. The method further comprises determining one or more services to make available based, at least in part, on the one or more roles, the one or more accesses, the one or more rights, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine proximity information of one or more devices with respect to at least a first access point, a second access point, or a combination thereof associated with at least one structure. The apparatus is also caused to process and/or facilitate a processing of the proximity information to determine one or more roles, one or more accesses, one or more rights, or a combination thereof. The apparatus is further caused to determine one or more services to make available based, at least in part, on the one or more roles, the one or more accesses, the one or more rights, or a combination thereof.

According to another embodiment, a computer-readable storage medium carries one or more sequences of one or more instructions which, when executed by one or more processors, cause, at least in part, an apparatus to determine proximity information of one or more devices with respect to at least a first access point, a second access point, or a combination thereof associated with at least one structure. The apparatus is also caused to process and/or facilitate a processing of the proximity information to determine one or more roles, one or more accesses, one or more rights, or a combination thereof. The apparatus is further caused to determine one or more services to make available based, at least in part, on the one or more roles, the one or more accesses, the one or more rights, or a combination thereof.

According to another embodiment, an apparatus comprises means for determining proximity information of one or more devices with respect to at least a first access point, a second access point, or a combination thereof associated with at least one structure. The apparatus also comprises means for processing and/or facilitating a processing of the proximity information to determine one or more roles, one or more accesses, one or more rights, or a combination thereof. The apparatus further comprises means for determining one or more services to make available based, at least in part, on the one or more roles, the one or more accesses, the one or more rights, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for configuring one or more mobile devices to one or more services associated with at least one structure based on various contexts, access criteria, and/or security levels are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "touch" (e.g., touch interaction) refers to a method of expediting wireless configuration (e.g., device discovery and selection) based, at least in part, on proximity (e.g., Received Signal Strength Indication (RSSI) values). More specifically, touching, at least for the purposes of the current disclosure, does not require that the system components (e.g., a mobile device and an access point) actually come into physical contact with each other. Holding the system components (e.g., a mobile device and an access point or another mobile device) in close proximity to one another (i.e., the RSSI reading of the device reaches a threshold criteria relative to the discovering device) for a short duration of time may be enough to trigger operations, after which the mobile device may be separated and utilized within the communication range of whatever wireless communication medium is being utilized in order to support system interaction. Such wireless interaction may be implemented utilizing various types of short-range wireless communication technologies (e.g., Bluetooth, Bluetooth LE, NFC, Wireless Fidelity (WiFi), or a combination thereof). While a multitude of wireless communication mediums are available, the various embodiments of the present invention disclosed herein use Bluetooth for the sake of explanation. In addition, touch interactions may work in one of two ways. First, "touch-to-select" refers to the example use case where the device with which the user performs the choice activity (e.g., by touching) has the physical means to perform the selection operation (e.g., by sending the inquiry and calculating the RSSI value from the response). Second, "touch-to-be-selected" refers to the example use case where the device with which the user performs the choice activity (i.e., by touching) does not have the physical means to perform the selection operation, but the physical operation is detected by the device being touched.

Figure 1:
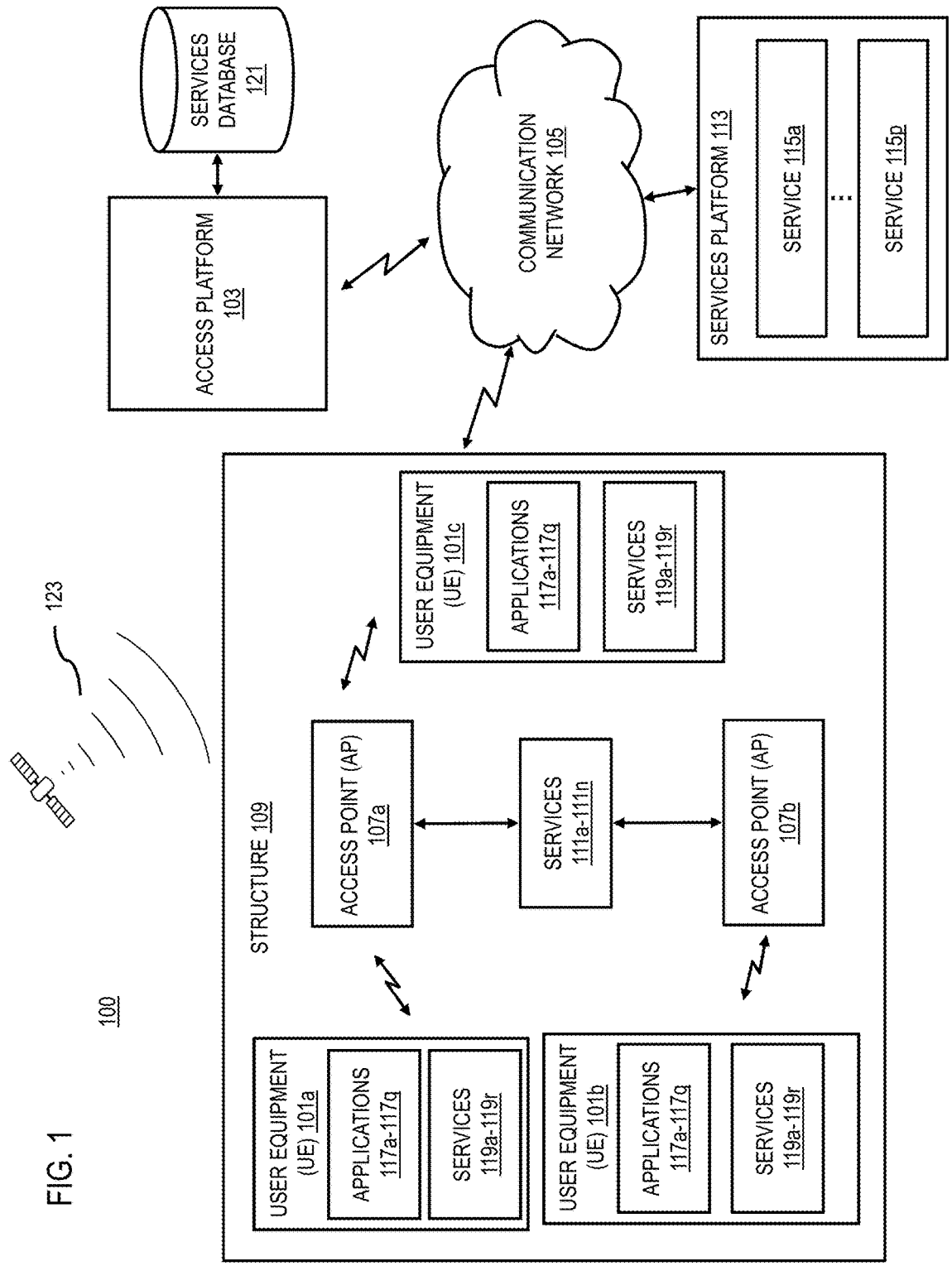
FIG. 1 is a diagram of a system capable of configuring one or more mobile devices to one or more services associated with at least one structure based on various contexts, access criteria, and/or security levels, according to one embodiment.

FIG. 1 is a diagram of a system capable of configuring one or more mobile devices to one or more services associated with at least one structure based on various contexts, access criteria, and/or security levels, according to one embodiment. As previously discussed, one area of interest among service providers and device manufacturers has been the development of interactive resources and services available to users of mobile devices (e.g., mobile phones or tablets) while driving or being a passenger in a vehicle. More specifically, the resources and services are provisioned between the mobile devices and one or more access points within the vehicle based on one or more short-range wireless communication technologies such as Bluetooth, Bluetooth LE, NFC, WiFi, or a combination thereof. Once a connection between a device and the vehicle has been established, the device can use the resources associated with the vehicle (e.g., loudspeakers, steering wheel buttons, hands-free or text-to-speech systems, displays, projectors, etc.) and the vehicle may benefit from the resources of the device (e.g., GPS sensors, internet connectivity, messaging technologies, display, projector etc.). This enables use cases which essentially require multiple devices, where some of them may be generic and some of them particular (e.g. belonging to a specific person or having particular access rights or resources or services). Also this enables orchestration of non-touch enabled devices. For example, the driver of the vehicle may listen to music stored on his or her mobile device as well as control the playback of the music with the steering wheel buttons and at the same time, use the mobile device as an auxiliary display showing driving related information (e.g., average speed). If there are multiple devices in car, they may act as loudspeakers (e.g. via an audio rendering service) providing enhanced audio capabilities.

However, the introduction and/or use of multiple mobile devices near or within the vehicle pose a number of dynamic configuration and security concerns. In particular, the resources, services, and connections (e.g., one or more APs) need to be managed based on various criteria such as ownership, security, bandwidth allocation, need, location, and necessity. More specifically, certain services require different kinds of authentication in different contexts (e.g., unlocking a door requires better security than merely using audio streaming services). Further, the context of the device user may affect the possible selection, offering, and using of services. For example, the driver may be the only user with access to the steering wheel buttons, but a passenger in the front seat may have access to audio streaming resources and a passenger in the backseat may have access to video streaming resources. The problem of selecting, offering, and using various services is also complicated by the exclusive nature of some services (e.g., only one user may use the loudspeakers at a time). In addition, multiple device users may want to share services associated with the vehicle, the one or more other devices (e.g., a multiplayer game), or a combination thereof.

To address these problems, a system 100 of FIG. 1 introduces the capability to configure one or more mobile devices to one or more services associated with at least one structure based on various contexts, access criteria, and/or security levels. In one embodiment, the system 100 first determines proximity information of one or more mobile devices (e.g., a mobile phone or tablet) with respect to at least a first access point, a second access point, or a combination thereof associated with at least one structure (e.g., a vehicle). Further, the first access point, the second access point, or a combination thereof provide for short-range wireless communications (e.g., Bluetooth, Bluetooth LE, NFC, WiFi, or a combination thereof). In an exemplary embodiment, the access points have touch to select functionality (i.e., they can detect the proximity of another Bluetooth device and obtain service descriptions of the Bluetooth services that the touching device is offering) and may have different characteristics and operations based on the status of the structure. In another example use case, the Bluetooth device may also have touch to select functionality and can detect the proximity of the one or more access points.

By way of example, in one example use case, the structure is a vehicle that has at least two Bluetooth access points, wherein minimally one or more access points are located in the front of the vehicle (e.g., the first access point) and one or more access points are located in the back of the vehicle (e.g., the second access point). As a result, the system 100 can make different services available to one or more devices at different parts of the vehicle depending on the proximity of the one or more devices to the one or more access points. For example, the first access point may be associated with services such as loudspeakers, steering wheel buttons, hands-free or text-to-speech systems, displays, projectors, etc. and the second access point may be associated with services such as rear seat media rendering. In another example use case, the structure is a building (e.g., a home) and one or more access points (e.g., the first access point) may be associated with high level control services (e.g., entry, climate controls, alarm systems, etc.) and other ones of the one or more access points (e.g., the second access point) may be associated with lower level control services (e.g., lighting, entertainment systems, etc.). While both structures are applicable to the system 100, the various embodiments of the present invention disclosed herein use a vehicle for the sake of explanation.

More specifically, the system 100 determines the proximity information based, at least in part, on one or more touch interactions, one or more proximity detection mechanisms, or a combination thereof. By way of example, in an example use case using Bluetooth, the discovering device (e.g., the first access point located in the front of the vehicle) is in inquiry mode and sends one or more identity (ID) packets, and the discoverable device (e.g., a mobile phone) scans periodically for ID packets and responds with frequency hopping synchronization (FHS) packets. In addition, the discoverable device may send an Extended Inquiry Response (EIR) after the FHS to deliver more information about the device (e.g., the device name, transmission (Tx) power, and information of supported service classes). Further, when the discovering device receives the inquiry response, it defines the RSSI from the FHS. The signal strength of the device is heavily attenuated when the signal leaves the antenna. The signal strength difference of devices a few centimeters apart compared to devices 50 centimeters apart can be several tens of decibels (dBs). This property of signal attenuation makes it possible to filter out devices based on their RSSI readings and therefore determine the proximity information of one or more devices relative to one or more access points. Moreover, the RSSI reading of a device can be followed and once it reaches a threshold criteria (e.g., in touching range) the discovering device (e.g., the first or second access point) can be selected. As a result, the user in this example use case is selecting a part of the vehicle (e.g., the first access point) by touching it (i.e., Touch-to-be-Selected). It is contemplated that the one or more access points inside of the vehicle may act as the necessary connection enabler between one or more devices as well as one or more physical access points (e.g., an antenna element) indicating to one or more users (e.g., a driver and/or passenger) that they can "touch" these points in order to trigger one or more functionalities.

In one embodiment, the system 100 next processes the proximity information to determine one or more roles, one or more accesses, one or more rights, or a combination thereof. In this example use case, device access and rights are based on one or more touch interactions among the one or more devices and the one or more access points. It is contemplated that one or more "roles" are not necessarily location dependent. However, it is also contemplated that the device that was used to unlock the driver's door is the driver's device and therefore has access, rights and limitations, if any, related to the role of the driver.

In one embodiment, the system 100 then processes the (a) proximity information (e.g., location within the vehicle); (b) context information associated with the one or more devices (e.g., status, types of applications running, etc.); the first access point, the second access point, or a combination thereof (e.g., status, pairing, rate of inquiry, etc.); or (c) a combination thereof to determine role information (e.g., which device is the "current" device being served by the system 100). In one embodiment, the system 100 further determines the role information based on an association of the first access point, the second access point, or a combination thereof with one or more roles. By way of example, the system 100 may determine that the one or more devices proximately located to the first access point, touching the first access point, using one or more services typically associated with the first access point (e.g., navigation), or a combination thereof are functioning in a particular role and therefore may have different accesses, rights, or a combination thereof relative to the vehicle than the one or more devices proximately located to the second access point, touching the second access point, using one or more services typically associated with the second access point (e.g., rear seat media rendering), or a combination thereof. Determining the role information is important because while it makes sense to default to the driver (e.g., the owner) to be able to use all of the vehicle's resources, it is also useful to allow other passengers to use some of the same resources in the appropriate context.

Based on the role information associated with the one or more devices, the system 100 next determines one or more authentication mechanisms for the one or more devices with respect to the one or more services, the vehicle, the first access point, the second access point, or a combination thereof. By way of example, one or more services may require triggering of link level security (i.e., high level security), while the security requirements for one or more other services may be relaxed to allow triggering by touch only. As a result, the system 100 ensures that undesired or hostile devices are not able to exploit the resources of the vehicle (e.g., swamp the services) or even attempt to use them (e.g., a random passerby cannot access the one or more access points of the vehicle and/or children in the backseat cannot access the steering wheel buttons). In one example use case, opening of a vehicle door always requires high level security, but when the vehicle is unlocked and the driver is inside, other services (e.g., rear seat media rendering) may be triggered by touch only. Also, it is contemplated that certain interior-related services (e.g., media rendering), which typically require less security in an unlocked state can still be accessed in a locked state, but then these services may require link level security.

In one embodiment, the system 100 next processes the role information to cause a designation of at least one primary device (e.g., the device of the driver) among the one or more devices concurrently in the vehicle, wherein access to the one or more services (e.g., loudspeakers, steering wheel buttons, hands-free or text-to-speech systems, displays, projectors, etc.), the vehicle, the first access point, the second access point, or a combination thereof by other ones of the one or more devices (e.g., devices associated with one or more passengers) is by approval from the user of the at least one primary device. As previously discussed, the system 100 determines access to one or more services based, at least in part, on the detected position of the device in or near the structure (e.g., a vehicle) and on one or more policies or rules associated with the different types of services. More specifically, the system 100 determines the at least one primary device minimally by determining the one or more access points being touched (e.g., the primary device is most likely touching the first access point). Further, it is contemplated that the user in the role of the driver (e.g., the owner of the vehicle) by default has control over the one or more services. More specifically, while one or more of the available services (e.g., loudspeakers) may be freely accessible by one or more passengers, the user of the at least one primary device (e.g., the driver and/or the owner) may at any moment cancel (i.e., veto) access to the one or more services.

In certain embodiments, the system 100 may optionally determine one or more modifications to the one or more roles based on one or more associations of the one or more devices with the one or more access points, wherein the one or more modifications may be for a predetermined period, for a duration of the one or more contexts, for at least the duration of the one or more services, on demand (e.g., driver preference), or a combination thereof. By way of example, the system 100 can enable a "role change" feature, which allows other ones of the one or more devices touching one or more access points typically associated with the role of the driver (e.g., the first access point) to assume the role of the driver (e.g., when users take turns driving the vehicle during a long trip). However, it is contemplated that this role change feature of the system 100 must be pre-approved by the driver of the vehicle.

In one embodiment, the system 100 determines the one or more services to make available to the one or more devices based on the one or more roles, the one or more accesses, the one or more rights, or a combination thereof. By way of example, in one example use case, when a front seat passenger touches one or more access points (e.g., the first access point) with his or her mobile device (e.g., a mobile phone or tablet), the system 100 determines what services, if any, can be offered to this device based on the role information associated with the device (e.g., front seat passenger) and the one or more authentication mechanisms associated with the one or more services (e.g., link level security). In one embodiment, the system 100 then presents to the user one or more notifications of possible functionalities that can be performed. More specifically, the system 100 can notify the user that one or more of the services may be immediately available (e.g., displaying speed and fuel or playing music from the device), but other possible services may first require consent (e.g., from the owner of the vehicle or the user currently using the service). As an example, the services that first require consent may include services such as loudspeakers, steering wheel controls, hands-free or text-to-speech systems, navigation, displays, projectors, etc.

In one embodiment, the system 100 further determines at least a portion of the one or more services from at least one of the one or more devices (e.g., the driver's device), one or more other devices (e.g., the one or more devices of the one or more passengers), the first access point, the second access point, the vehicle, or a combination thereof. By way of example, when one or more devices touch one or more access points (e.g., the first or second access point), the system 100 determines the descriptions of the one or more services associated with the device (e.g., one or more applications). The system 100 then causes a brokering of the at least a portion of the one or more services to at least another one of the one or more devices, the one or more other devices, the first access point, the second access point, the vehicle, or a combination thereof. As previously discussed, the system 100 can present one or more notifications of possible brokered functionalities that can be performed. Again, the one or more brokered services may be immediately available or they may first require consent depending on the particular service.

In one embodiment, the system 100 optionally determines to store information associated with the one or more services from at least one of the one or more devices, the one or more other devices, or a combination thereof. For example, even if the system 100 does not recognize and/or have the ability to use the one or more services determined from the one or more devices within the vehicle, the system 100 can still record and store the one or more services and/or service descriptions. In one embodiment, the system 100 can then cause the brokering of the at least a portion of the one or more services based on the stored information. More specifically, if the system 100 determines that one or more matching services and/or service descriptions are within the presence of the vehicle (i.e., inside or within touch range), then the system 100 can offer one or more of these services to the one or more other devices as brokered foreign services. It is contemplated that the system 100 would first notify the device potentially provisioning the one or more foreign services via the system 100, the one or more devices attempting to share the one or more services, or a combination thereof for permission to broker the one or more foreign services. Depending on the response, the system 100 would either proceed with brokering the one or more foreign services or inform the respective devices of the denial. By way of example, the system 100 may determine that two passengers both have the same multiplayer game on their respective devices. The system 100 would then notify the users of the determined compatibility and determine whether the users would like to take advantage of the vehicle's resources to play the game (e.g., the rear entertainment system, loudspeakers, etc.).

As shown in FIG. 1, the system 100 comprises one or more user equipment (UE) 101*a*-101*c* (e.g., a mobile phone or tablet) (also collectively referred to as UEs 101) having connectivity to an access platform 103 via a communication network 105. The UEs 101 also have connectivity to access points 107*a* and 107*b* (also collectively referred to as APs 107), which are associated with a structure 109 (e.g., a vehicle) via one or more short-range communication technologies (e.g., Bluetooth, Bluetooth LE, NFC, WiFi, or a combination thereof). The APs 107 also have local connectivity to services 111*a*-111*n* (also collectively referred to as services 111). In one embodiment, the system 100 has been simplified to include only two APs 107 (e.g., AP 107*a* and AP 107*b*), however, it is contemplated that a plurality of APs 107 can be utilized in connecting the UEs 101 with the services 111. More specifically, in one embodiment, AP 107*a* represents the first access point and is typically associated with services 111 such as steering wheel buttons, hands-free or text-to-speech systems, navigation, loudspeakers, etc. and AP 107*b* represents the second access point and is typically associated with services 111 such as rear seat media rendering.

In one embodiment, the APs 107 and the access platform 103 also have connectivity to a services platform 113 via the communication network 105. The services platform 113 provides one or more services 115*a*-115*p* (also collectively referred to as services 115) to the components of the system 100. The services 115 may include a wide variety of services such as content provisioning services for the one or more applications 117*a*-117*q* of the UEs 101 (e.g., mapping and/or navigation applications, media applications, multi-player games, etc.) (also collectively referred to as applications 117), one or more services 119*a*-119*r* of the UEs 101 (e.g., mapping and/or navigation services, social media services, etc.) (also collectively referred to as services 119), and the services 111. Further, the access platform 103 is connected to a services database 121. The services database 121 may include one or more service descriptions obtained from the UEs 101 that are touching and/or have recently touched the APs 107, the local services 111, the services 115, or a combination thereof as well as a list of one or more authenticated devices based, at least in part, on Bluetooth addresses associated with the UEs 101. The access platform 103 may exist in whole or in part within the structure 109, or independently and the services database 121 may exist in whole or in part with the access platform 103, or independently.

In certain embodiments, the applications 117, the services 119, or a combination thereof may utilize location-based technologies (e.g., GPS, cellular triangulation, Assisted GPS (A-GPS), etc.) to make a request to one or more services 115 for location-based data (e.g., mapping and navigation information) based on a position relative to a UE 101. For example, the UE 101 may include a GPS receiver to obtain geographic coordinates from satellites 123 to determine its current location.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the access platform 103 first determines proximity information of one or more mobile devices (e.g., the UEs 101) with respect to at least a first access point (e.g., AP 107a), a second access point (e.g., AP 107b), or a combination thereof associated with the structure 109 (e.g., a vehicle). Further, AP 107a, AP 107b, or a combination thereof provide for short-range wireless communications (e.g., Bluetooth, Bluetooth LE, NFC, WiFi, or a combination thereof). By way of example, in one example use case, the structure 109 is a vehicle that has at least two Bluetooth access points (e.g., APs 107), wherein minimally one or more of the access points are located in the front of the vehicle (e.g., AP 107a) and one or more of the access points are located in the back of the vehicle (e.g., AP 107b). As a result, the access platform 103 can make different services (e.g., services 111 or 115) available to one or more devices (e.g., UEs 101) at different parts of the structure 109 depending on the proximity of the one or more UEs 101 to one or more APs 107.

More specifically, the access platform 103 determines the proximity information based, at least in part, on one or more touch interactions, one or more proximity detection mechanisms, or a combination thereof. As previously discussed, the signal strength difference of devices (e.g., the UEs 101) a few centimeters apart compared to devices 50 centimeters apart can be several tens of dBs. This property of signal attenuation makes it possible to filter out devices based on their RSSI readings and therefore determine the proximity information of the one or more devices (e.g., the UEs 101) relative to one or more access points (e.g., the APs 107). Moreover, the RSSI reading of a device (e.g., the UE 101a) can be followed and once it reaches a threshold criteria (e.g., in touching range) the discovering devices (e.g., AP 107a) can be selected. As previously discussed, the user in this example use case is selecting AP 107a by touching it (i.e., Touch-to-be-Selected).

In one embodiment, the access platform 103 next processes the proximity information to determine one or more roles, one or more accesses, one or more rights, or a combination thereof. As previously discussed, in this example use case, authentication/access/rights for the UEs 101 are based on one or more touch interactions among the UEs 101 and the APs 107. It is contemplated that one or more "roles" are not necessarily location dependent. However, it is also contemplated that the device (e.g., UE 101a) that was used to unlock the driver's door of the vehicle 109 is the driver's UE 101 and therefore has access and limitations related to the role of the driver.

In one embodiment, the system access platform 103 more specifically processes the (a) proximity information (e.g., location relative to the vehicle 109); (b) context information associated with the UEs 101 (e.g., status, types of applications running, etc.); AP 107a, AP 107b, or a combination thereof (e.g., status, pairing, rate of inquiry, etc.); or (c) a combination thereof to more specifically determine role information (e.g., which UE 101 is the "current" device being served by the access platform 103). In one embodiment, the access platform 103 further determines the role information based on an association of the AP 107a, the AP 107b, or a combination thereof with one or more roles. By way of example, the access platform 103 may determine that the one or more devices (e.g., UE 101a) proximately located to the first access point (e.g., AP 107a), touching the first access point, using one or more services 111 typically associated with the first access point (e.g., navigation), or a combination thereof are functioning in a particular role and therefore may have different accesses, rights, or a combination thereof relative to the vehicle 109 than the one or more devices (e.g., UE 101b) proximately located to the second access point (e.g., AP 107b), touching the second access point, using one or more services 111 typically associated with the second access point (e.g., rear seat media rendering), or a combination thereof. As previously discussed, determining the role information is important because while it makes sense to default to the driver (e.g., the owner) to be able to use all of the vehicle's resources, it is also useful to allow other passengers to use some of the same resources in the appropriate context.

Based on the role information associated with the UEs 101, the access platform 103 next determines one or more authentication mechanisms for the UEs 101 with respect to one or more services (e.g., services 111 and 115), the structure 109 (e.g., a vehicle), the APs 107a and 107b, or a combination thereof. By way of example, one or more services 111 may require triggering of link level security (i.e., high level security), while the security requirements for one or more other services 111 may be relaxed to allow triggering by touch only. More specifically, in one example use case, one service 111 (e.g., opening a door) of structure 109 always requires high level security, but when the structure 109 is unlocked and the owner is inside, other services 111 (e.g., rear seat media rendering) may be triggered by touch only.

In one embodiment, the access platform 103 next processes the role information to cause a designation of at least one primary UE 101 (e.g., UE 101a) among the one or more UEs 101, wherein access to the one of more services (e.g., services 111), the structure 109, the APs 107, or a combination thereof by other ones of the UEs 101 (e.g., UE 101b or 101c) is by approval from the owner of the at least one primary device. More specifically, the access platform 103 determines the at least one primary device (e.g., the UE 101a) minimally by determining the one or more access points being touched (e.g., AP 107a). Further, it is contemplated that the user in the role of owner or driver of structure 109 by default has control over the one or more services (e.g., services 111) and may also have a veto over all of the services (e.g., services 111 or 115) that require use of the loudspeakers.

In certain embodiments, the access platform 103 may optionally determine one or more modifications to the one or more roles based on one or more associations of the UEs 101 with the APs 107, wherein the one or more modifications may be for a predetermined period, for a duration of the one or more contexts, for at least the duration of the one or more services (e.g., services 111), on demand (e.g., driver preferences), or a combination thereof. By way of example, the access platform 103 can enable a "role change" feature, which allows other ones of the UEs 101 (e.g., UE 101b or UE 101c) touching one or more access points typically associated with the role of the driver (e.g., AP 107a) to assume the role of the driver (e.g., when users take turns driving the vehicle 109 during a long trip). However, it is contemplated that this role change feature of the access platform 103 must be pre-approved by the owner or driver of the vehicle 109.

In one embodiment, the access platform 103 determines the one or more services (e.g., services 111) to make available to the UEs 101 based on the one or more roles, the one or more accesses, the one or more rights, or a combination thereof. By way of example, in one example use case, when a front seat passenger touches one or more access points (e.g., AP 107a) with his or her mobile device (e.g., UE 101c), the access platform 103 determines what services (e.g., services 111), if any, can be offered to the UE 101c based on the role information associated with the device (e.g., front seat passenger) and the one or more authentication mechanisms associated with the services 111 (e.g., link level security). In one embodiment, the access platform 103 then presents to the user one or more notifications of possible functionalities that can be performed. More specifically, the access platform 103 can notify the user that one or more services (e.g., services 111) may be immediately available (e.g., display of speed and fuel or playing music from the UE 101c), but other possible services 111 may first require consent (e.g., from the owner of the vehicle 109 or from the user currently using the service 111). As an example, the services 111 that first require consent may include services 111 such as loudspeakers, steering wheel buttons, hands-free or text-to-speech systems, displays, projectors, etc.

In one embodiment, the access platform 103 further determines at least a portion of the one or more services (e.g., applications 117) from at least one of the UEs 101 (e.g., UE 101a), one or more other UEs 101 (e.g., UE 101b and/or 101c), the APs 107, the structure 109, or a combination thereof. By way of example, when one or more devices (e.g., UE 101b) touch one or more APs 107, the access platform 103 determines the descriptions of the one or more applications 117 associated with the UE 101. The access platform 103 then causes a brokering of the at least a portion of the one or more applications 117 to at least another one of the one or more devices (e.g., UE 101b or 101c), the one or more other devices (e.g., UE 101b and/or UE 101c), the APs 107, the structure 109, or a combination thereof. As previously discussed, the access platform 103 can present to the users of one or more UEs 101 one or more notifications of possible brokered functionalities that can be performed. Again, the one or more brokered services (e.g., applications 117) may be immediately available or they may first require consent depending on the particular service.

In one embodiment, the access platform 103 optionally determines to store information associated with the one or more services (e.g., one or more applications 117) from at least one of the one or more devices (e.g., UE 101a), the one or more other devices (e.g., UE 101b and/or 101c), or a combination thereof in the services database 121. For example, even if the access platform 103 does not recognize and/or have the ability to use the one or more applications 117 determined from one or more of the UEs 101 within the vehicle 109, the access platform 103 can still record the one or more applications 117 and/or service descriptions, which can then be stored in the services database 121. In one embodiment, the access platform 103 can then cause the brokering of the at least a portion of the one or more applications 117 based on the stored information in the services database 121. More specifically, if the access platform 103 determines that matching services (e.g., matching applications 117) and/or service descriptions are inside or near the vehicle 109, then the access platform 103 can offer one or more these applications 117 to the one or more UEs 101 as brokered foreign services. As previously discussed, it is contemplated that the access platform 103 would first notify the UE 101 potentially provisioning the one or more applications 117, the one or more UEs 101 attempting to share the one or more applications 117 via the access platform 103, or a combination thereof for permission to broker the one or more applications 117. Depending on the response, the access platform 103 would either proceed with brokering the one or more applications 117 or inform the respective UEs 101 of the denial. By way of example, the access platform 103 may determine that UE 101b and 101c both have the same multiplayer game. The access platform 103 would then notify the users of the respective UEs 101 and determine whether the users would like to take advantage of the resources of the vehicle 109 (e.g., the rear entertainment system, loudspeakers, etc.).

By way of example, the UEs 101, the access platform 103, the APs 107, the services platform 113, the services 115, the applications 117, the services 119, the services database 121, and the satellites 123 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
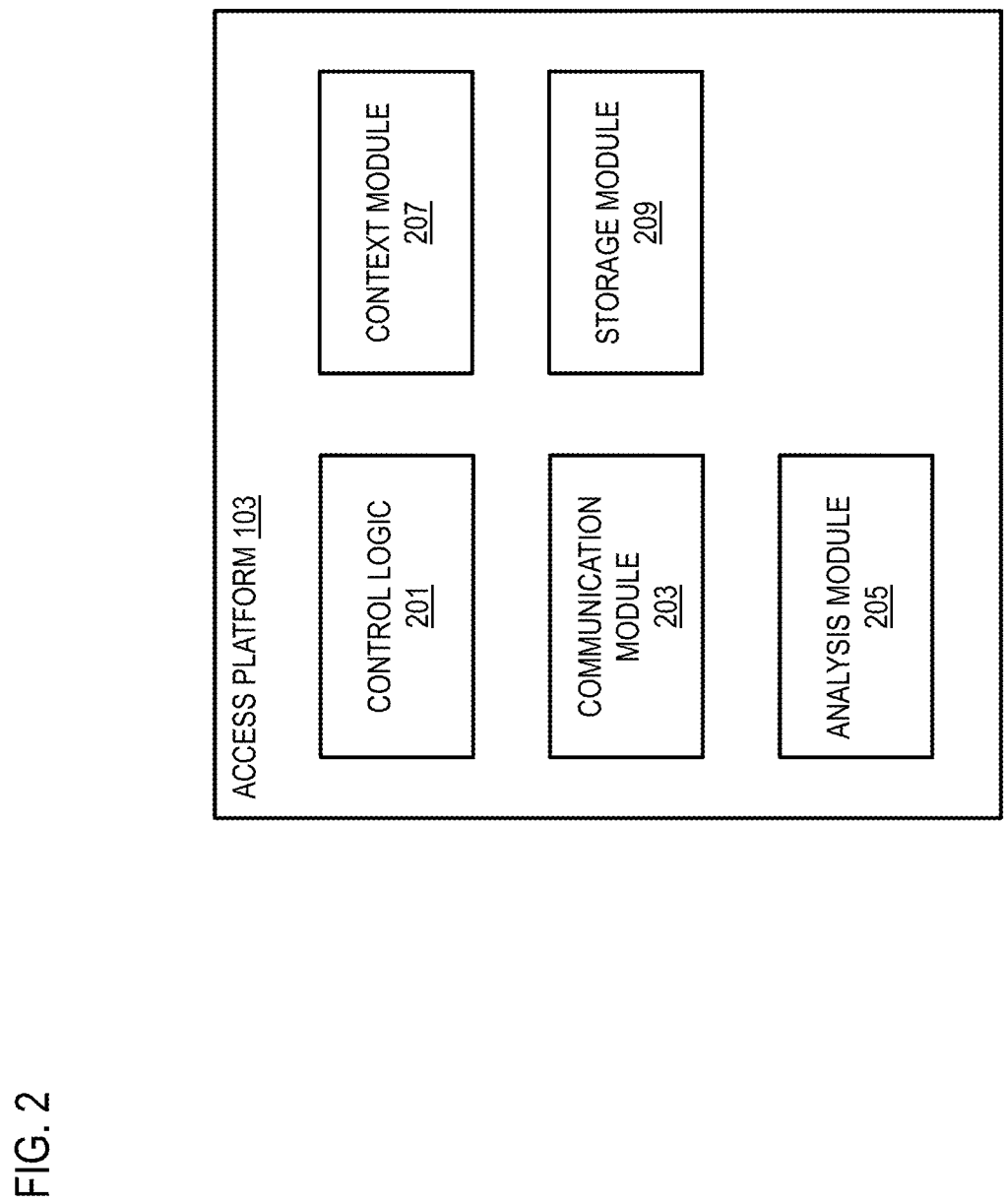
FIG. 2 is a diagram of the components of an access platform, according to one embodiment.

FIG. 2 is a diagram of the components of an access platform 103, according to one embodiment. By way of example, the access platform 103 includes one or more components for configuring one or more mobile devices to one or more services associated with at least one structure based on various contexts, access criteria, and/or security levels. It is contemplated that the functions of these components may be combined in one or more components or performed by other components of equivalent functionality. In this embodiment, the access platform 103 includes a control logic 201, a communication module 203, an analysis module 205, a context module 207, and a storage module 209.

The control logic 201 oversees tasks, including tasks performed by the communication module 203, the analysis module 205, the context module 207, and the storage module 209. For example, although the other modules may perform the actual task, the control logic 201 may determine when and how those tasks are performed or otherwise direct the other modules to perform the task.

The communication module 203 is used for communication between the access points 107 and the services 111 of the structure 109, the access platform 103, the services 115 of the services platform 113, the applications 117 of the UEs 101, the services database 121, and the satellites 123. The communication module 203 may be used to communicate commands, requests, data, etc. The communication module 203 also may be used to facilitate one or more short-range wireless communications among the UEs 101 and the APs 107 including, at least in part, Bluetooth, Bluetooth LE, NFC, WiFi, or a combination thereof. For example, the communication module 203, in an example use case using Bluetooth, may be used in connection with the APs 107 to transmit one or more ID packets. The communication module 203 may also be used to broker the at least a portion of the one or more services (e.g., one or more applications 117) to at least another one or the one or more devices (e.g., UE 101a), the one or more other devices (e.g., UE 101b and/or 101c), the one or more access points (e.g., the APs 107), the at least one structure 109 (e.g., a vehicle), or a combination thereof. Further, the communication module 203, in connection with the storage module 209, also may be used to broker the at least a portion of the one or more services (e.g., one or more applications 117) stored in the services database 121.

The analysis module 205 is used to determine proximity information of one or more devices (e.g., the UEs 101) relative to at least a first access point (e.g., AP 107a), a second access point (e.g., AP 107b), or a combination thereof associated with at least one structure (e.g., a vehicle). More specifically, the analysis module 205 determines the proximity information based on one or more touch interactions, one or more proximity mechanisms, or a combination thereof. The analysis module 205 may also be used to process the proximity information to determine one or more roles, one or more accesses, one or more rights, or a combination thereof. More specifically, the analysis module 205, in connection with the context module 207, may also be used to process (a) the proximity information; (2) context information associated with the one or more devices (e.g., the UEs 101), the at least one structure (e.g., structure 109), the APs 107, or a combination thereof to determine role information. In particular, the analysis module 205, in connection with the context module 207, further determines the role information based on an association of the first access point (e.g., AP 107a), the second access point (e.g., AP 107b), or a combination thereof with one or more roles. For example, the first access point (e.g., AP 107a), located in the front of the structure 109, is typically associated with one or more services such as loudspeakers, steering wheel buttons, hands-free or text-to-speech systems, displays, projectors, etc. and the second access point (e.g., AP 107b), located in the back of the structure 109, is typically associated with one or more services such media rendering services.

By way of example, in one example use case using Bluetooth, the one or more APs 107 of the structure 109 are activated and doing inquiry (e.g., at 2.56 s intervals and long enough to find appropriate scanner device). When one or more devices (e.g., UE 101a) are found by the APs 107 (e.g., AP 107a), the analysis module 205 is used to check the RSSI level of the UE 101a to determine if it in the predetermined range of action (i.e., whether the RSSI level is above a certain threshold). If the analysis module 205 determines that the RSSI level is above the threshold, then the analysis module 205 determines if the one or more authentication mechanisms for the UE 101a with respect to the one or more services (e.g., services 111), the structure 109, the AP 107a, or a combination thereof. For example, the analysis module 205 may be used to determine if the Bluetooth address of the UE 101a is in the authenticated devices list in the services database 121. If so, then the analysis module 205 causes, at least in part, the control logic 201 and the communication module 203 to establish a secure connection between the UE 101a and the AP 107a.

In one embodiment, the analysis module 205 also may be used to determine at least a portion of the one or more services (e.g., one or more applications 117) from at least one of the one or more devices (e.g., the UE 101a), one or more other devices (e.g., UE 101b or 101c), the APs 107, the structure 109, or a combination thereof. By way of example, when one or more devices (e.g., the UEs 101) touch one or more access points (e.g., the APs 107), the analysis module 205 determines the descriptions of the one or more applications 117 associated with the UEs 101, which then can be brokered by the communication module 203 to the structure 109, the other ones of the UEs 101, or a combination thereof.

The context module 207 is used to process the role information to cause, at least in part, a designation of at least one primary device (e.g., the UE 101a) among the one or more devices (e.g., the UEs 101), wherein access to the one or more services (e.g., the services 111), the structure 109, the APs 107, or a combination thereof by other ones of the one or more devices (e.g., UE 101b and/or 101c) is by approval from the at least one primary device. The context module 207 may also be used to determine one or more modifications to the one or more roles based, at least in part, on one or more associations of the one or more devices (e.g., the UEs 101) with the one or more access points (e.g., the APs 107). More specifically, the context module 207 may be used to determine the one or more modifications for a predetermined period, for a duration of the one or more contexts, for at least the duration of the one or more services (e.g., services 111), on demand, or a combination thereof. As previously discussed, the context module 207 can enable a "role change" feature, which allows other ones of the one or more devices (e.g., UE 101b or 101c) touching one or more access points typically associated with the role of the driver (e.g., AP 107a) to assume the role of the driver (e.g., when users take turns driving the vehicle 109 during a long trip). Further, the context module 207, in connection with the control logic 201 and the communication module 203, also may be used to determine one or more services (e.g., services 111) to make available based, at least in part, on the one or more roles, the one or more accesses, the one or more rights, or a combination thereof. By way of example, the in one example use case, when a front seat passenger touches one or more access points (e.g., AP 107a) with his or her mobile device (e.g., UE 101c), the context module 207 determines what services (e.g., services 111), if any, can be offered to this device based on the role information associated with the device (e.g., front seat passenger) and the one or more authentication mechanisms associated with the one or more services.

The storage module 209 is used to manage the storage of one or more service descriptions in the services database 121, which were obtained from the UEs 101 that are touching and/or have recently touched the APs 107, the local services 111, the services 115, or a combination thereof as well as a list of one or more authenticated devices based, at least in part, on Bluetooth addresses associated with the UEs 101.

Figure 3:
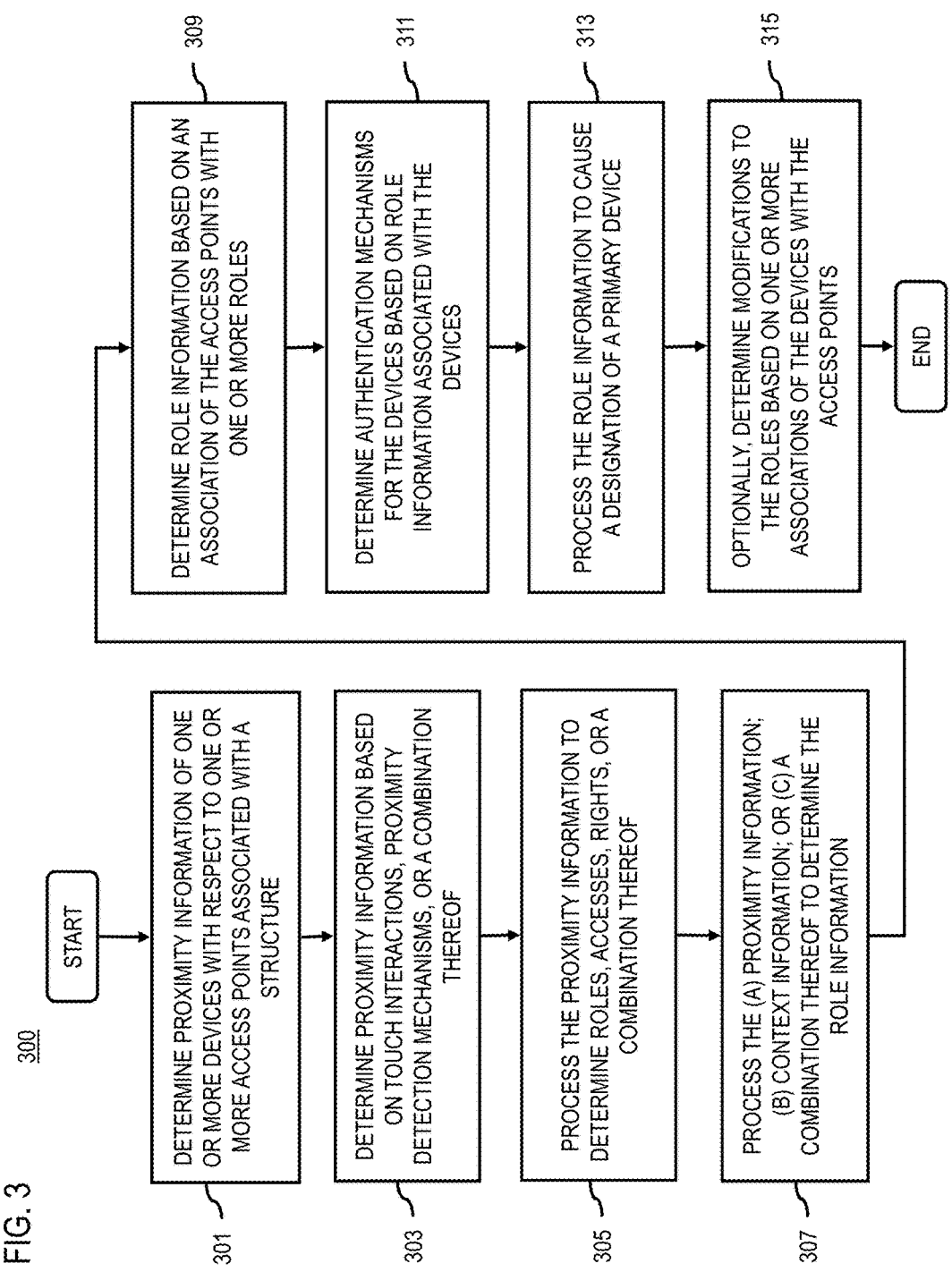
FIGS. 3 and 4 are flowcharts of processes for configuring one or more mobile devices to one or more services associated with at least one structure based on various contexts, access criteria, and/or security levels, according to one embodiment.
Figure 4:
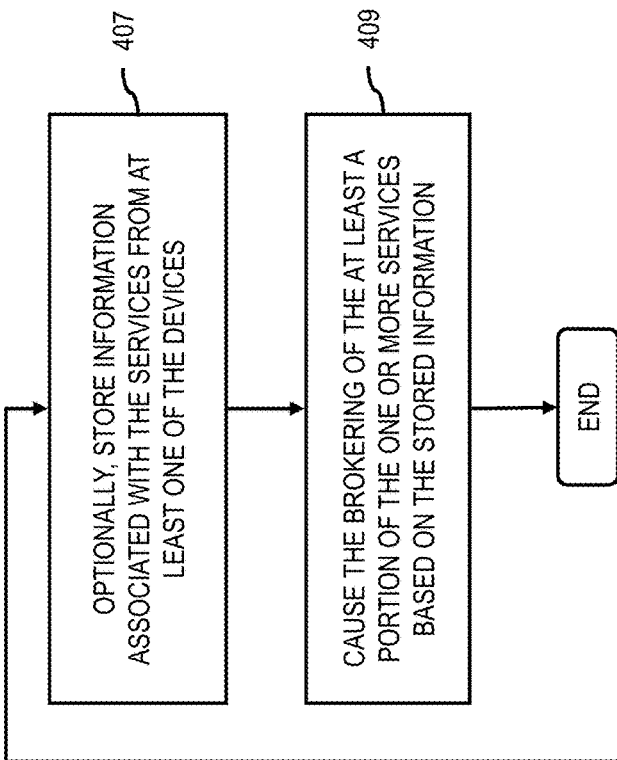
Figure 4:
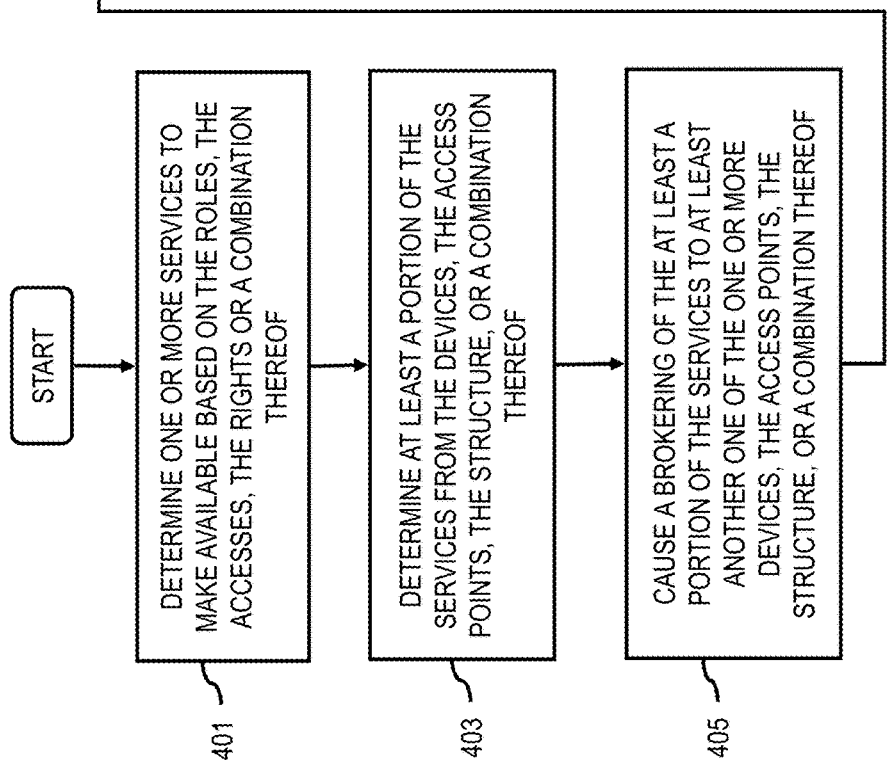
Figure 8:
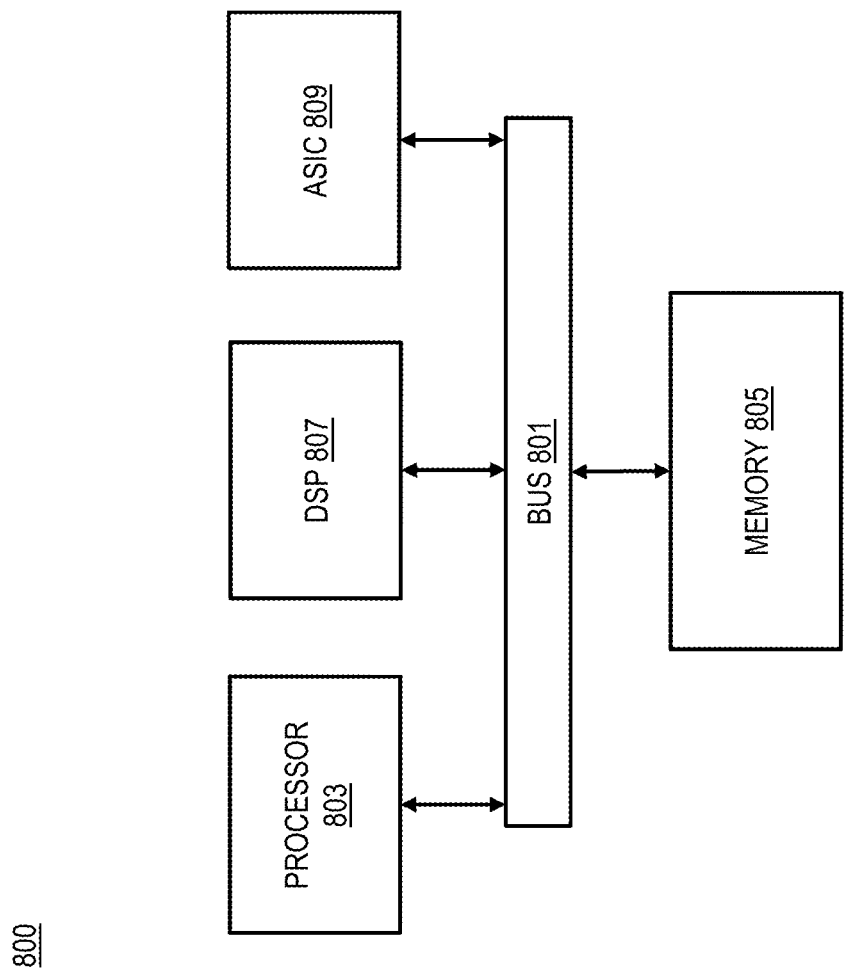
FIG. 8 is a diagram of a chip set that can be used to implement an embodiment of the invention.

FIGS. 3 and 4 are flowcharts of processes for configuring one or more mobile devices to one or more services associated with at least one structure based on various contexts, access criteria, and/or security levels. FIG. 3 depicts a process 300 of determining proximity and/or role information associated with one or more mobile devices. In one embodiment, the access platform 103 performs the process 300 and is implemented in, for instance, a chip set including a processor and a memory as shown in FIG. 8. In step 301, the access platform 103 determining proximity information of one or more devices with respect to at least a first access point, a second access point, or a combination thereof associated with at least one structure. By way of example, the first access point, the second access point, or a combination thereof provide for short-range wireless communications (e.g., Bluetooth, Bluetooth LE, NFC, WiFi, or a combination thereof). Further, in one example use case, the structure is a vehicle that has at least two Bluetooth access points, wherein minimally one or more access points are located in the front of the vehicle (e.g., the first access point) and one or more access points are located in the back of the vehicle (e.g., the second access point). As a result, the access platform 103 can make different services available to one or more devices (e.g., a mobile phone or tablet) depending on the proximity of the one or more devices to the one or more access points and the authentications of the one or more devices. As previously discussed, the first access point may be associated with services such as loudspeakers, steering wheel buttons, hands-free or text-to-speech systems, displays, projectors, etc. and the second access point may be associated with services such as rear seat media rendering. In another example use case, the structure is a building (e.g., a home) and one or more access points (e.g., the first access point) may be associated with high level control services (e.g., entry, climate controls, alarm systems, etc.) and other ones of the one or more access points (e.g., the second access point) may be associated with lower level control services (e.g., lighting, entertainment systems, etc.).

In step 303, the access platform 103 determine the proximity information based, at least in part, on one or more touch interactions, one or more proximity detection mechanisms, or a combination thereof. By way of example, touch interaction can refer to a method of expediting wireless configuration (e.g., device discovery and selection) based, at least in part, on RSSI values. More specifically, when the discovering device (e.g., the first access point) receives the inquiry response from the discoverable device (e.g., a mobile phone), it defines an RSSI value from the FHS. As previously discussed, the property of signal attenuation makes it possible to filter out devices based on their RSSI readings and therefore determine the proximity information of one or more devices relative to one or more access points within a vehicle. Moreover, the RSSI reading of a device can be followed and once it reaches a threshold criteria (e.g., in touching range) the discovering device (e.g., the first access point) can be selected. As a result, the user in this example use case, is selecting a part of the vehicle (e.g., the first access point) by touching it (i.e., Touch-to-be-Selected).

In step 305, the access platform 103 processes and/or facilitates a processing of the proximity information to determine one or more roles, one or more accesses, one or more rights, or a combination thereof. In this example use case, device authentication/access/rights are based on one or more touch interactions among the one or more devices and the one or more access points. It is contemplated that one or more "roles" are not necessarily location dependent. However, it is also contemplated that the device that was used to unlock the driver's door is the driver's device and therefore has access and limitations related to the role of the driver.

In step 307, the access platform 103 processes and/or facilitates a processing of (a) the proximity information; (b) context information associated with the one or more devices, the at least one structure, the first access point, the second access point, or a combination thereof; or (c) a combination thereof to determine the role information. In step 309, the access platform 103 further determining the role information is based, at least in part, on an association of the first access point, the second access point, or a combination thereof with one or more roles. As previously discussed, the proximity information concerns the location of the one or more devices relative to the one or more access points in the at least one structure. Further, the context information may relate to the status of the one or more devices (e.g., the types of applications running on the device), the status of the one or more access points (e.g., pairings, rate of inquiry, etc.), the status of the at least one structure (e.g., a locked state, an operational state, etc.), or a combination thereof. By way of example, the access platform 103 may determine that the one or more devices proximately located to the first access point, touching the first access point, using one or more services typically associated with the first access point (e.g., navigation), or a combination thereof are functioning in a particular role and therefore may have different accesses, rights, or a combination thereof relative to the vehicle than the one or more devices proximately located to the second access point, touching the second access point, using one or more services typically associated with the second access point (e.g., rear seat media rendering), or a combination thereof. As previously discussed, determining the role information is important because while it makes sense to default to the driver (e.g., the owner) to be able to use all of the vehicle's resources, it is also useful to allow other passengers to use some of the same resources in the appropriate context.

In step 311, the access platform 103 determines one or more authentication mechanisms for the one or more devices with respect to the one or more services, the at least one structure, the first access point, the second access point, or a combination thereof based, at least in part, on role information associated with the one or more devices. By way of example, one or more services may require triggering of link level security (i.e., high level security), while the security requirements for one or more other services may be relaxed to allow triggering by touch only. In one example use case, opening of a vehicle door always requires high level security, but when the vehicle is unlocked and the driver is inside, other services (e.g., rear seat media rendering) may be triggered by touch only.

In step 313, the access platform 103 processing and/or facilitating a processing of the role information to cause, at least in part, a designation of at least one primary device among the one or more devices, wherein access to the one or more services, the at least one structure, the first access point, the second access point, or a combination thereof by other ones of the one or more devices is by approval from the at least one primary device. As previously discussed, the access platform 103 determines access to one or more services based, at least in part, on the detected position of the device in or near the structure (e.g., a vehicle) and on one or more policies or rules associated with the different types of one or more services. More specifically, the access platform 103 determines the at least one primary device minimally by determining the one or more access points being touched (e.g., the primary device is most likely touching the first access point). In particular, while one or more of the available services (e.g., loudspeakers) may be freely accessible by one or more passengers, the user of the at least one primary device (e.g., the driver and/or the owner) may at any moment cancel (i.e., veto) access to the one or more services.

In step 315, the access platform 103 determines one or more modifications to the one or more roles based, at least in part, on one or more associations of the one or more devices with the one or more access points, wherein the one or more modifications may be for a predetermined period, for a duration of the one or more contexts, for at least the duration of the one or more services, on demand, or a combination thereof. By way of example, the access platform 103 can enable a "role change" feature, which allows other ones of the one or more devices touching one or more access points typically associated with the role of the driver (e.g., the first access point) to assume the role of the driver (e.g., when users take turns driving the vehicle during a long trip). However, it is contemplated that this role change feature must be pre-approved by the driver of the vehicle.

FIG. 4 depicts a process 400 of determining one or more services to make available to one or more devices associated with at least one structure. In one embodiment, the access platform 103 performs the process 400 and is implemented in, for instance, a chip set including a processor and a memory as shown in FIG. 8. In step 401, the access platform 103 determines one or more services to make available based, at least in part, on the one or more roles, the one or more accesses, the one or more rights, or a combination thereof. By way of example, in one example use case, when a front seat passenger touches one or more access points (e.g., the first access point) with his or her mobile device (e.g., a mobile phone or tablet), the access platform 103 determines what services, if any, can be offered to this device based on the role information associated with the device (e.g., front seat passenger) and the one or more authentication mechanism associated with the one or more services. In one embodiment, the access platform 103 then presents to the user one or more notifications of possible functionalities that can be performed. More specifically, the access platform 103 can notify the user that one or more services may be immediately available (e.g., display of speed and fuel or playing music from the device), but other possible services may first require consent (e.g., from the owner of the vehicle or the user currently using the service). As an example, the services that first require consent may include services such as loudspeakers, steering wheel buttons, hands-free or text-to-speech systems, displays, projectors, etc. An illustrative example of the one or more notifications as presented in the user interface in depicted in FIG. 6A.

In step 403, the access platform 103 determines at least a portion of the one or more services from at least one of the one or more devices, one or more other devices, the first access point, the second access point, the at least one structure, or a combination thereof. By way of example, when one or more devices (e.g., a mobile phone) touch one or more access points (e.g., the first or second access point), the access platform 103 determines the description of the one or more services (e.g., one or more applications) associated with the one or more devices.

Figure 6A:
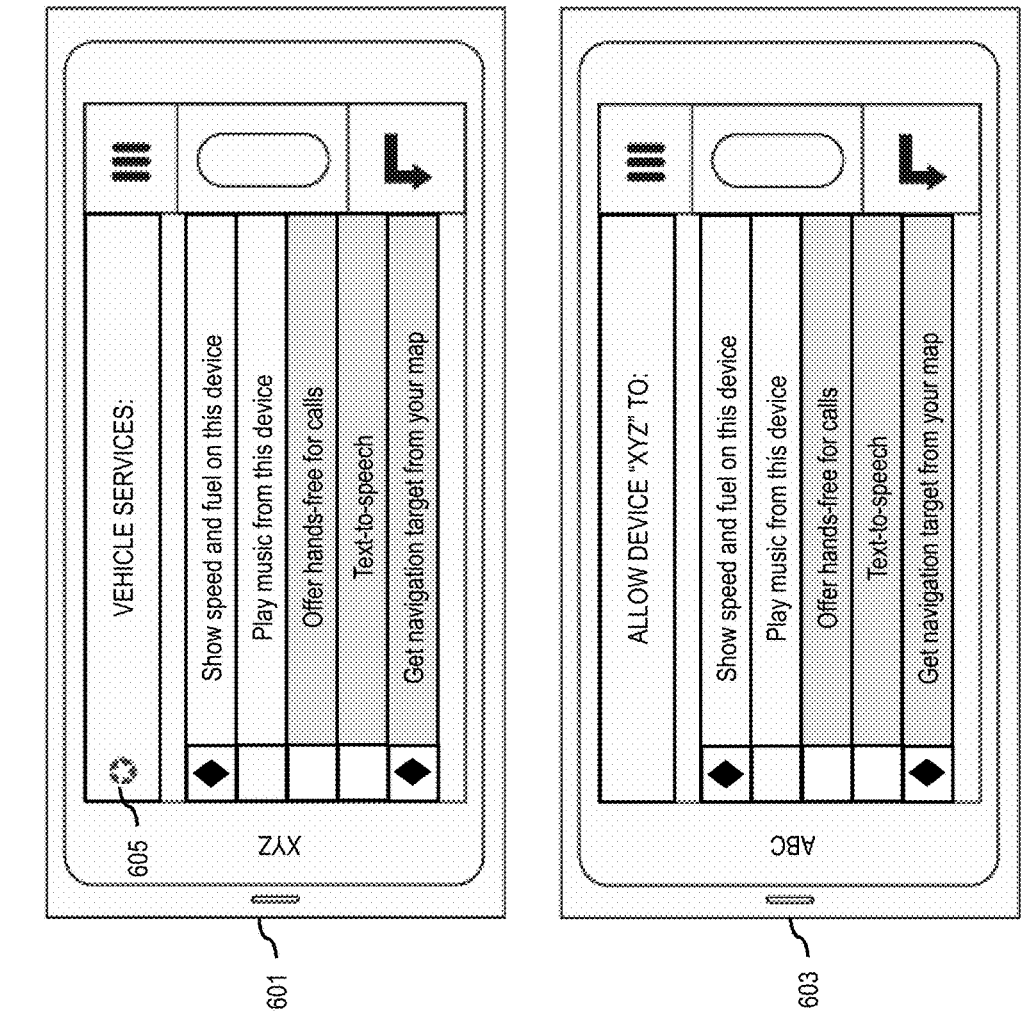
FIGS. 6A and 6B are diagrams of user interfaces utilized in the processes of FIGS. 3 and 4, according to various embodiments.
Figure 6B:
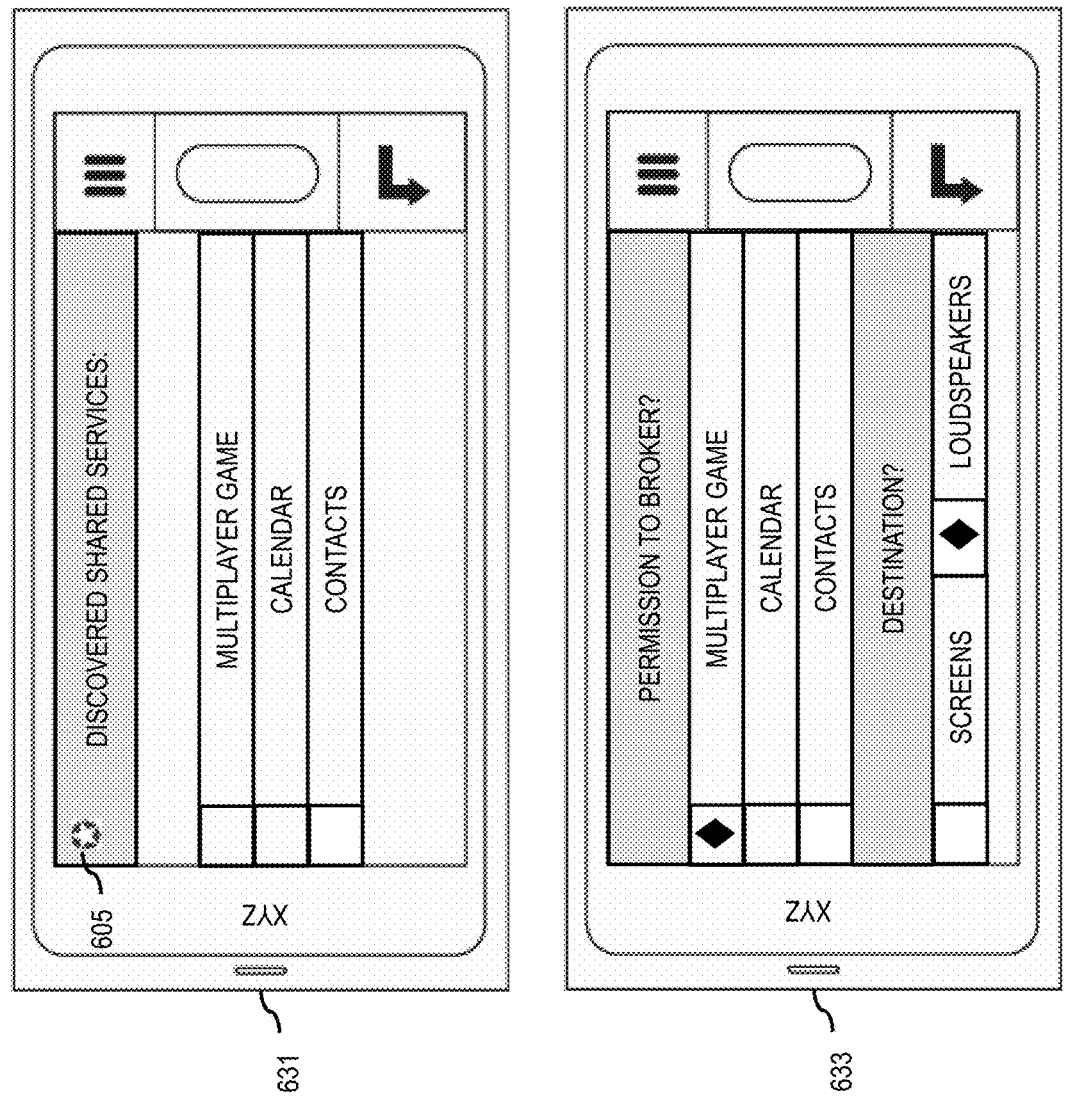

In step 405, the access platform 103 causes, at least in part, a brokering of the at least a portion of the one or more services to at least another one of the one or more devices, the one or more other devices, the first access point, the second access point, the at least one structure, or a combination thereof. As previously discussed, the access platform 103 can present to the users of one or more devices one or more notifications of possible brokered functionalities that can be performed. Again, the one or more brokered services may be immediately available or they may first require consent depending on the particular service. An illustrative example of the one or more notifications associated with brokered services as presented in the user interface is depicted in FIG. 6B.

In step 407, the access platform 103 optionally determines to store information associated with the one or more services from at least one of the one or more devices, the one or more mother devices, or a combination thereof. By way of example, even if the access platform 103 does not recognize and/or have the ability to use the one or more services determined from the one or more devices within the vehicle, the access platform 103 can still record the one or more services and/or service descriptions, which can then be stored in one or more databases (e.g., the service database 121).

In step 409, the access platform 103 causes, at least in part, the brokering of the at least a portion of the one or more services based, at least in part, on the stored information. More specifically, if the access platform 103 determines that matching services and/or service descriptions are within the presence of the vehicle (i.e., inside or within touch range), then the access platform 103 can offer one or more of these services to one or more other devices as brokered foreign services. It is contemplated that the access platform 103 would first notify the device potentially provisioning the one or more services, the one or more devices attempting to share the one or more services via the access platform 103, or a combination thereof for permission to broker the one or more foreign services. Depending on the response, the access platform 103 would either proceed with brokering the one or more foreign services or inform the respective devices of the denial. By way of example, the access platform 103 may determine that two passengers both have the same multiplayer game on their respective devices. The access platform 103 would then notify the users of the determined compatibility and then determine whether the users would like to take advantage of vehicle's resources to play the game (e.g., the rear seat media services, loudspeakers, etc.).

Figure 5:
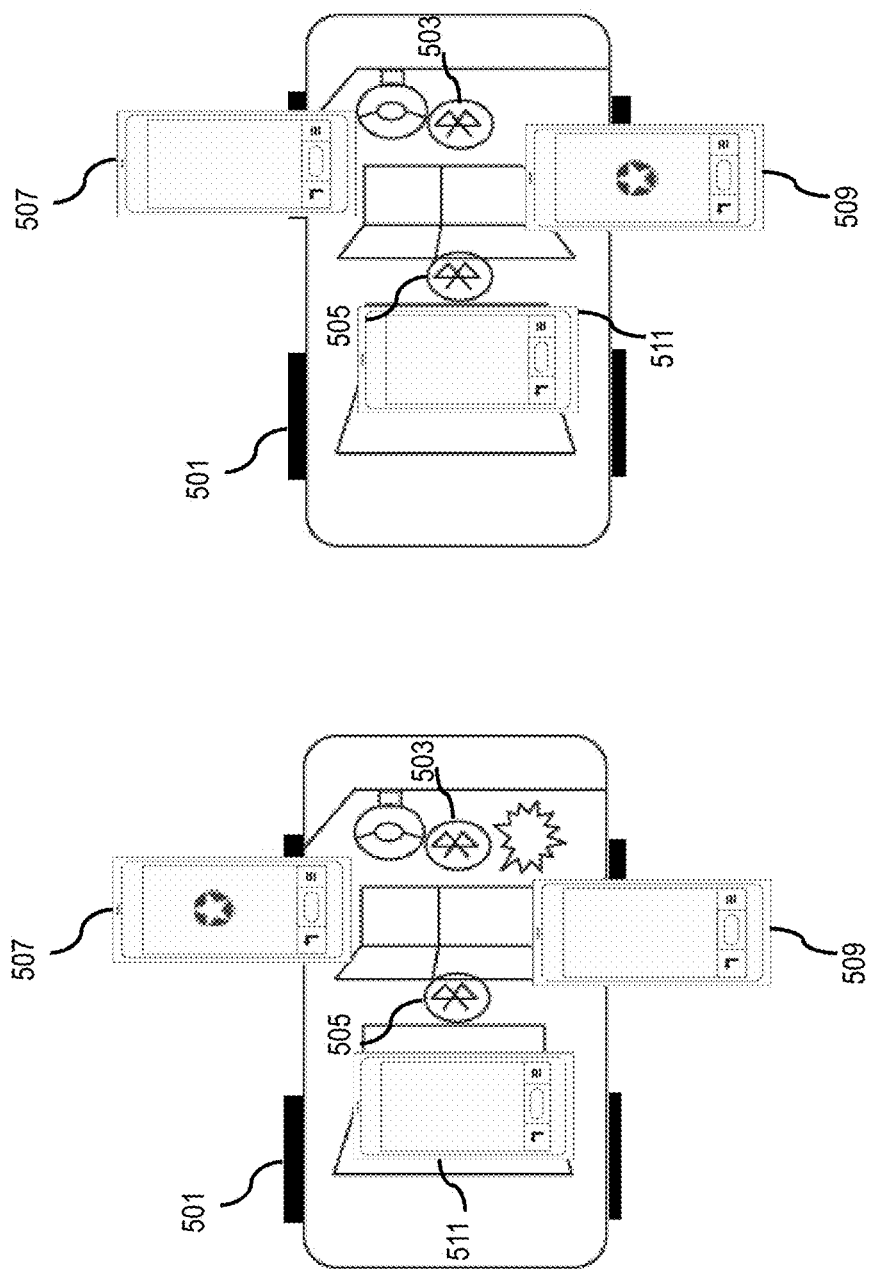
FIG. 5 is a diagram of an example use case depicting the utilization of the processes of FIGS. 3 and 4, according to various embodiments.

FIG. 5 is a diagram of an example use case depicting the utilization of the processes of FIGS. 3 and 4, according to various embodiments. As shown, FIG. 5 depicts a vehicle 501 that has at least a first access point (e.g., access point 503) and a second access point (e.g., access point 505). More specifically, access points 503 and 505 provide for short-range wireless communications (e.g., Bluetooth, Bluetooth LE, NFC, WiFi, or a combination thereof). In addition, FIG. 5 also depicts one or more devices (e.g., devices 507, 509, and 511). In particular, device 507 (e.g., the device of the owner of the vehicle 501) is initially the "current" device that the vehicle 501 attempts to connect by default with some default services (e.g., steering wheel buttons, loudspeakers, etc.) via one or more access points (e.g., access point 503).

In one embodiment, the system 100 first determines proximity information of the devices 507, 509, and 511 with respect to the first access point 503 and the second access point 505. As previously discussed, the system 100 can make different services available to the devices 507, 509, and 511 depending on their proximity to the access points 503 and 505. For example, the first access point 503 may be associated with such services as loudspeakers, steering wheel buttons, hands-free or text-to-speech systems, etc. and the second access point 505 may be associated with services such as rear seat media rendering. More specifically, the system 100 determines the proximity information based, at least in part, on one or more touch interactions, one or more proximity detection mechanisms, or a combination thereof. In this example use case, the device 509 of the front seat passenger is touching the access point 503.

In one embodiment, the system 100 next processes the proximity information between device 509 and access point 503 to determine one or more roles, one or more accesses, one or more rights, or a combination thereof associated with the device 509. In this example use case, the system 100 determines that the device 509 is located in the front passenger seat and therefore is not the driver of the vehicle 501, however, device 509 may still have one or more roles relative to the vehicle 509. Therefore, the system 100 also processes context information associated with the one or more devices (e.g., devices 507, 509, and 511), the vehicle 501, and the access points 503 and 505, to more specifically determine role information associated with the device 509. By way of example, the system 100 may determine that the device 509, touching the access point 503 and running one or more navigation applications, is functioning in the role of vehicle navigator. Based on the role information associated with the device 509, the system 100 next determines one or more authentication mechanisms for the device 509 with respect to the one or more services. As previously discussed, one or more services (e.g., entry) may require triggering of link level security while the security requirements and/or authentication mechanism for one or more other services (e.g., loudspeakers) may be relaxed to allow for triggering by touch only. For example, the device 509 may have access to the navigation system of the vehicle 501, but only the driver can set and/or modify the navigation target (e.g., an amusement park).

In one embodiment, the system 100 then determines one or more services to make available to the device 509 based on the one or more roles, the one or more accesses, the one or more rights, or a combination thereof associated with the device 509. More specifically, the system 100 presents the user of the device 509 with a set of possible functionalities or services that can be performed. An illustrative example of the one or more notifications presented in an example user interface is depicted in FIG. 6A. The system 100 can also notify the user of the device 509 that one or more services may be immediately available (e.g., display of speed and fuel or playing music from the device 509), but other possible service may still require consent of the driver (e.g., the owner of device 507 or the user currently using the particular service). As an example, the user of device 509 may still have to request the consent of the driver in order to access services such as loudspeakers, steering wheel buttons, hands-free or text-to-speech systems, displays, projectors, etc.

In one embodiment, the system 100 further determines at least a portion of the one or more services from at least one of the one or more devices (e.g., device 507), one or more other devices (e.g., devices 509 and/or 511), the access points 503 and 505, the vehicle 501, or a combination thereof. As depicted in FIG. 5, when the device 509 touches the access point 503 or when the device 511 touches the access point 505, the system 100 determines the descriptions of the one or more services (e.g., one or more applications) associated with the one or more devices. In one embodiment, the system 100 the causes a brokering of the at least a portion of the one or more services to at least another one of the one or more devices (e.g., devices 507, 509, and 511), the one or more other devices (e.g., devices 509 and/or 511), the access points 503 and/or 505, the vehicle 501, or a combination thereof. As previously discussed, the system 100 can present to the users of one or more devices (e.g., devices 507, 509, and 511) one or more notifications of possible brokered functionalities that can be performed. Again, the one or more brokered services may be immediately available or they may first require consent depending on the particular service. An illustrative example of the one or more notifications associated with brokered services is also depicted in FIG. 6B.

In one embodiment, the system 100 optionally determines to store information associated with the one or more services from at least one of the one or more devices (e.g., devices 507, 509, and 511), the one or more other devices (e.g., devices 509 or 511), or a combination thereof. For example, even if the system 100 does not recognize and/or have the ability to use the one or more services determined from the devices 507, 509, and 511, the system 100 can still record the one or more services (e.g., one or more applications) and/or service descriptions, which can then be stored in one or more databases. In one embodiment, the system 100 can then cause the brokering of the at least a portion of the one or more services based on the stored information. More specifically, if the system 100 determines that one or more matching services and/or service descriptions are within the presence of the vehicle 501 (i.e., inside or within touch range), then the system 100 can offer one or more of these services to one or more of the devices 507, 509, and 511 as brokered foreign services. As previously discussed, it is contemplated that the system 100 would first notify the device potentially provisioning the one or more foreign services, the one or more devices attempting to share the one or more services via the system 100 (e.g., devices 509 and 511), or a combination thereof for permission to broker the one or more foreign services. By way of example, the system 100 may determine that devices 509 and 511 both have the same multiplayer game on their respective devices. The system 100 would then notify the users of devices 509 and 511 of the determined compatibility and determine whether the users would like to take advantage of the vehicle's resources to play the game (e.g., the loudspeakers).

FIGS. 6A and 6B are diagrams of user interfaces utilized in the processes of FIGS. 3 and 4, according to various embodiments. As shown, the example user interfaces of FIGS. 6A and 6B include one or more user interface elements and/or functionalities created and/or modified based, at least in part, on information, data, and/or signals resulting from the processes (e.g., processes 300 and 400) described with respect to FIGS. 3 and 4. More specifically, FIG. 6A illustrates two user interfaces (e.g., interfaces 601 and 603) depicting one or more notifications of possible functionalities or services associated with the vehicle that can be made available by the system 100. In this example use case, interface 601 is owned by user "XYZ" and interface 603 is owned by user "ABC," the driver of the vehicle.

In one embodiment, the system 100 first determines one or more services to make available to one or more touching devices (e.g., interface 601) as indicated by the symbol 605. More specifically, the system 100 determines the one or more services based on the one or more roles, the one or more accesses, the one or more rights, or a combination thereof associated with interface 601. In this example use case, the system 100 already determined, based on the proximity and context information associated with interface 601, that the user of interface 601 is located in the front passenger seat and is functioning in the role of the navigator of the vehicle. In one embodiment, the system 100 then notifies the user of the interface 601 that one or more services may be immediately available (e.g., "show speed and fuel on this device" and "play music from this device"), but other possible services first require consent of the driver (e.g., "offer hands-free for calls," "text-to-speech," and "get navigation target from your map"). In this example use case, the user of interface 601 requests one service that is immediately available (e.g., "show speed and fuel on this device") and one service that first requires consent (e.g., "get navigation target from your map"). Because the user associated with the interface 601 is functioning as the navigator, the user of the interface 603 grants the user of interface 601 access to both of the requested services and the system 100 consequently makes these two services associated with the vehicle available to the user of interface 601.

FIG. 6B illustrates two user interfaces (e.g., interfaces 631 and 633) depicting one or more notifications of one or more foreign services associated with the one or more devices in the vehicle that can be brokered by the system 100. In one embodiment, the system 100 determines at least a portion of the one or more services from at least one of the one or more devices (e.g., interface 631), one or more other devices, the first access point, the second access point, the vehicle, or a combination thereof. By way of example, when one or more devices (e.g., interface 631) touches one or more access points (e.g., a first access point) as indicated by symbol 605, the system 100 determines the descriptions of the one or more services (e.g., one or more applications) associated with the device (e.g., "multiplayer game," "calendar," and "contacts"). The system 100 then offers a brokering of the at least a portion of the one or more services to at least another one of the one or more devices (e.g., interface 631), the one or more other devices, the first access point, the second access point, the vehicle, or a combination thereof. In addition, in one embodiment, the system 100 optionally determines to store information associated with the one or more services from at least one of the one or more devices (e.g., interface 631), the one or more other devices, or a combination thereof. For example, even if the system 100 does not recognize and/or have the ability to use the one or more services (e.g., "multiplayer game," "calendar," and "contacts") determined from the one or more devices within the vehicle (e.g., interface 631), the system 100 can still record the one or more services and/or service descriptions, which can then be stored in one or more databases. In one embodiment, the system 100 can then cause the brokering of the at least a portion of the one or more services based on the stored information. More specifically, if the system 100 determines that one or more matching services and/or service descriptions are within the presence of the vehicle (e.g., "multiplayer game," "calendar," and "contacts"), then the system 100 can offer one or more of these services to the one or more devices (e.g., interface 631) as brokered foreign services. As depicted in FIG. 6B, the system 100 notifies the device potentially provisioning the one or more foreign services, the one or more devices attempting to share services via the system 100 (e.g., interface 631), or a combination thereof for permission to broker the one or more foreign services. As depicted in interface 633, the user of device "XYZ" has determined to allow the system 100 to broker the multiplayer game of his or her device with the one or more other devices in the vehicle that also has the same multiplayer game and has elected to use the loudspeakers of the vehicle to play the game, which in certain example use cases may further require the consent of the user in the role of the driver (e.g., the owner of the vehicle).

The processes described herein for configuring one or more mobile devices to one or more services associated with at least one structure based on various contexts, access criteria, and/or security levels may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
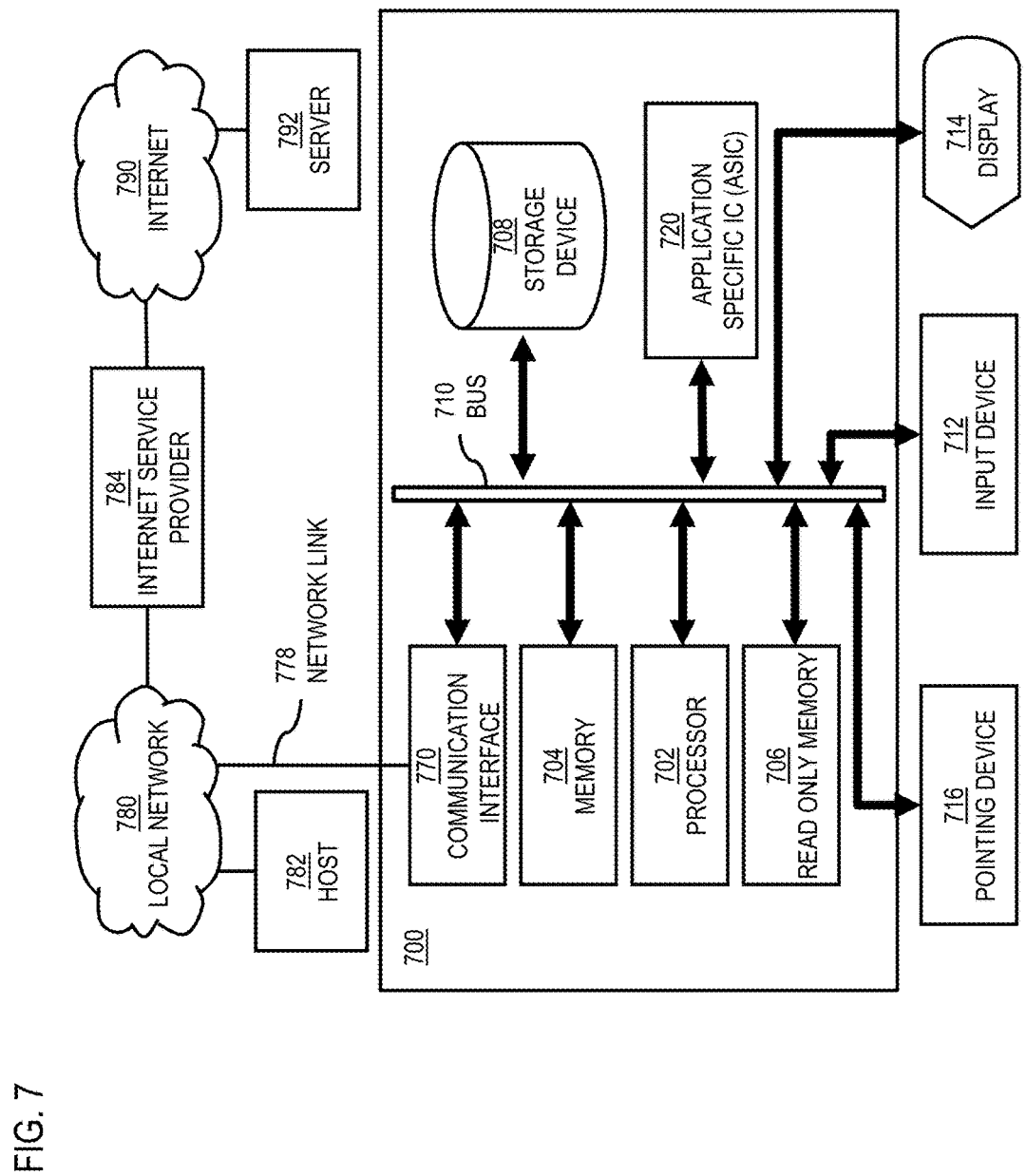
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to configure one or more mobile devices to one or more services associated with at least one structure based on various contexts, access criteria, and/or security levels as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of configuring one or more mobile devices to one or more services associated with at least one structure based on various contexts, access criteria, and/or security levels.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to configure one or more mobile devices to one or more services associated with at least one structure based on various contexts, access criteria, and/or security levels. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for configuring one or more mobile devices to one or more services associated with at least one structure based on various contexts, access criteria, and/or security levels. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for configuring one or more mobile devices to one or more services associated with at least one structure based on various contexts, access criteria, and/or security levels, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for configuring one or more mobile devices to one or more services associated with at least one structure based on various contexts, access criteria, and/or security levels to the UEs 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to configure one or more mobile devices to one or more services associated with at least one structure based on various contexts, access criteria, and/or security levels as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of configuring one or more mobile devices to one or more services associated with at least one structure based on various contexts, access criteria, and/or security levels.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor.

Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to configure one or more mobile devices to one or more services associated with at least one structure based on various contexts, access criteria, and/or security levels. The memory 805 also stores the data associated with or generated by the execution of the inventive steps.

Figure 9:
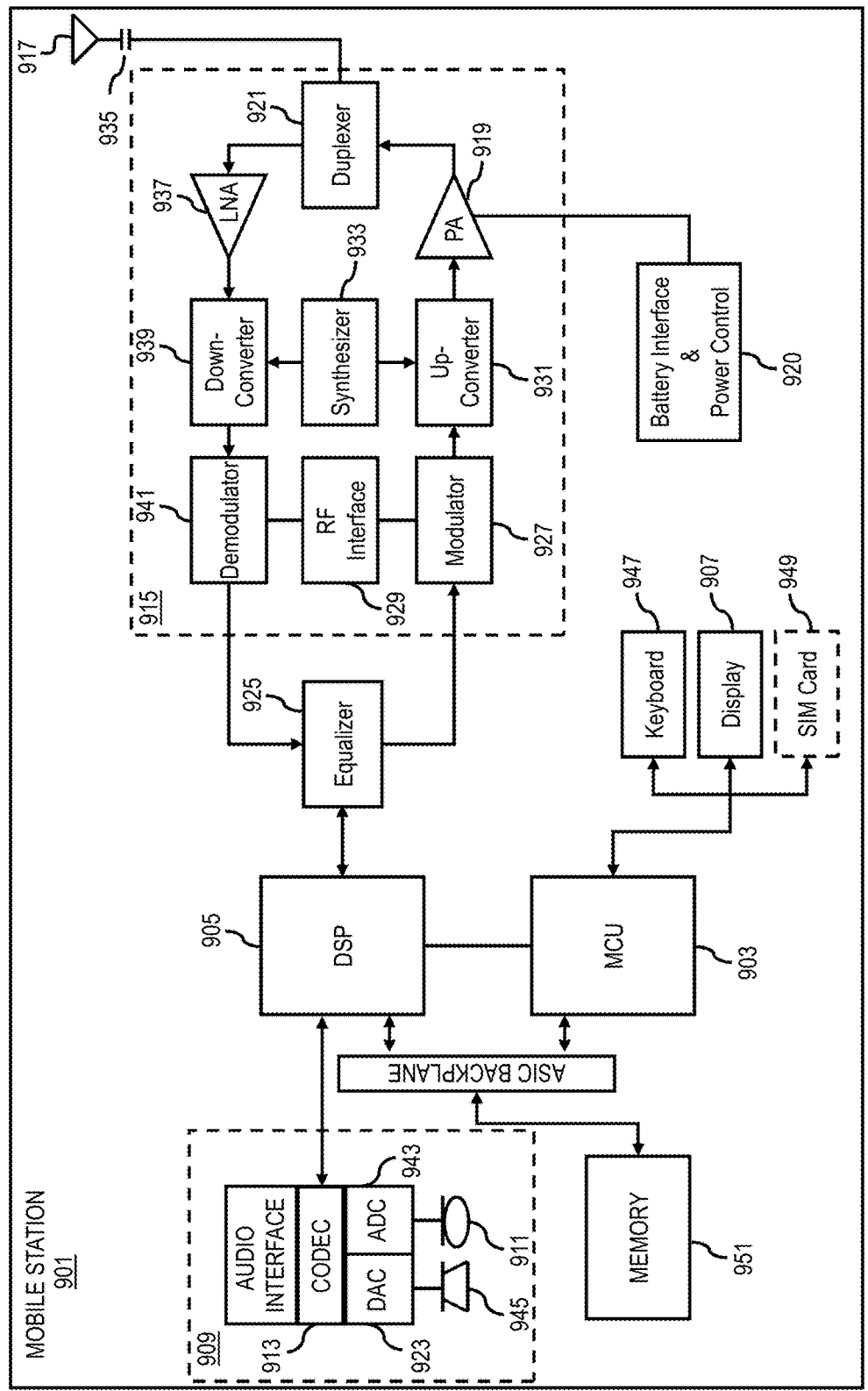
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of configuring one or more mobile devices to one or more services associated with at least one structure based on various contexts, access criteria, and/or security levels. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of configuring one or more mobile devices to one or more services associated with at least one structure based on various contexts, access criteria, and/or security levels. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to configure one or more mobile devices to one or more services associated with at least one structure based on various contexts, access criteria, and/or security levels. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by a processor, proximity information of one or more devices with respect to at least a first wireless access point and a second wireless access point associated with at least one automotive device;
    determining context information associated with the one or more devices;
    processing the proximity information and the context information to determine a role of a driver and a role of a passenger in a vehicle containing the at least one automotive device, wherein the role of the driver and the role of passenger specify one or more accesses, one or more rights, or a combination thereof for the one or more devices;
    determining one or more services associated with an automobile to make available to the one or more devices based, at least in part, on the role of the driver and the role of the passenger;
    determining one or more authentication mechanisms for the one or more devices with respect to the one or more services associated with the automobile, the at least one automotive device, the first access point, the second access point, or a combination thereof based, at least in part, on the role of the driver and the role of the passenger associated with the one or more devices; and
    designating at least one primary device for the role of the driver among the one or more devices,
    wherein access to the one or more services, the at least one automotive device, the first access point, the second access point, or a combination thereof by other ones of the one or more devices is by approval from the at least one primary device.

2. A method of claim 1, further comprising:
    determining the proximity information based, at least in part, on one or more touch interactions with the first and/or the second wireless access point, one or more proximity detection mechanisms, or a combination thereof.

3. A method of claim 1, wherein the context information associated with the one or more devices includes status, applications running, pairing status with wireless access point, rate of inquiry, or a combination thereof.

4. A method of claim 1, further comprising:
    determining the one or more roles is based, at least in part, on an association of the first access point, the second access point, or a combination thereof with the one or more roles.

5. A method of claim 1, further comprising:
    determining one or more modifications to the one or more roles based, at least in part, on one or more associations of the one or more devices with the first access point, the second access point, or a combination thereof,
    wherein the one or more modifications may be for a predetermined period, for a duration of the one or more context information, for at least the duration of the one or more services, on demand, or a combination thereof.

6. A method of claim 1, further comprising:
    determining at least a portion of the one or more services from at least one of the one or more devices, one or more other devices, the first access point, the second access point, the at least one automotive device, or a combination thereof; and
    causing, at least in part, a brokering of the at least a portion of the one or more services to at least another one of the one or more devices, the one or more other devices, the first access point, the second access point, the at least one structure, or a combination thereof.

7. A method of claim 6, further comprising:
    storing information associated with the one or more services from at least one of the one or more devices, the one or more other devices, or a combination thereof; and
    causing, at least in part, a brokering of the at least a portion of the one or more services based, at least in part, on the stored information.

8. A method of claim 1, wherein the first access point and the second access point provide for short-range wireless communications including, at least in part, Bluetooth, Bluetooth LE, Near Field Communication, Wireless Fidelity, or a combination thereof.

9. A method of claim 1, wherein a first authentication mechanism for a first device with respect to a first service is different from a second authentication mechanism for a second device with respect to a second service, and
the first authentication mechanism comprises a higher security criteria than the second authentication mechanism.

10. An apparatus comprising:
at least one processor; and
at least one memory including computer program code for one or more programs,
the at least one memory and the computer program code configured to, with the at least one processor, cause the apparatus to perform at least the following,
determine, by a processor, proximity information of one or more devices with respect to at least a first wireless access point and a second wireless access point associated with at least one automotive device;
determine context information associated with the one or more devices;
process the proximity information and the context information to determine a role of a driver and a role of a passenger in a vehicle containing the at least one automotive device, wherein the role of the driver and the role of passenger specify one or more accesses, one or more rights, or a combination thereof for the one or more devices;
determine one or more services associated with an automobile to make available to the one or more devices based, at least in part, on the role of the driver and the role of passenger;
determine one or more authentication mechanisms for the one or more devices with respect to the one or more services associated with the automobile, the at least one automotive device, the first access point, the second access point, or a combination thereof based, at least in part, on the role of the driver and the role of passenger associated with the one or more devices; and
designate at least one primary device for the role of the driver among the one or more devices,
wherein access to the one or more services, the at least one automotive device, the first access point, the second access point, or a combination thereof by other ones of the one or more devices is by approval from the at least one primary device.

11. An apparatus of claim 10, wherein the apparatus is further caused to:
determine the proximity information based, at least in part, on one or more touch interactions with the first and/or the second wireless access point, one or more proximity detection mechanisms, or a combination thereof.

12. An apparatus of claim 10, wherein the context information associated with the one or more devices includes status, applications running, pairing status with wireless access point, rate of inquiry, or a combination thereof.

13. An apparatus of claim 10, wherein the apparatus is further caused to:
determine the one or more roles is based, at least in part, on an association of the first access point, the second access point, or a combination thereof with the one or more roles.

14. An apparatus of claim 10, wherein the apparatus is further caused to:
determine one or more modifications to the one or more roles based, at least in part, on one or more associations of the one or more devices with the first access point, the second access point, or a combination thereof,
wherein the one or more modifications may be for a predetermined period, for a duration of the one or more context information, for at least the duration of the one or more services, on demand, or a combination thereof.

15. An apparatus of claim 10, wherein the apparatus is further caused to:
determine at least a portion of the one or more services from at least one of the one or more devices, one or more other devices, the first access point, the second access point, the at least one automotive device, or a combination thereof; and
cause, at least in part, a brokering of the at least a portion of the one or more services to at least another one of the one or more devices, the one or more other devices, the first access point, the second access point, the at least one structure, or a combination thereof.

16. An apparatus of claim 15, wherein the apparatus is further caused to:
store information associated with the one or more services from at least one of the one or more devices, the one or more other devices, or a combination thereof; and
cause, at least in part, a brokering of the at least a portion of the one or more services based, at least in part, on the stored information.

17. An apparatus of claim 10, wherein the first access point and the second access point provide for short-range wireless communications including, at least in part, Bluetooth, Bluetooth LE, Near Field Communication, Wireless Fidelity, or a combination thereof.

* * * * *